US008677136B2

(12) United States Patent
Brokenshire et al.

(10) Patent No.: US 8,677,136 B2
(45) Date of Patent: **\*Mar. 18, 2014**

(54) AUTHENTICATING MESSAGES USING CRYPTOGRAPHIC ALGORITHM CONSTANTS SUPPLIED TO A STORAGE-CONSTRAINED TARGET

(75) Inventors: Daniel Alan Brokenshire, Round Rock, TX (US); Harm Peter Hofstee, Austin, TX (US); Mohammad Peyravian, Morrisville, NC (US)

(73) Assignee: Google Inc., Mountain View, CA (US)

( \* ) Notice: Subject to any disclaimer, the term of this patent is extended or adjusted under 35 U.S.C. 154(b) by 35 days.

This patent is subject to a terminal disclaimer.

(21) Appl. No.: 13/326,489

(22) Filed: Dec. 15, 2011

(65) Prior Publication Data

US 2012/0096278 A1    Apr. 19, 2012

Related U.S. Application Data

(63) Continuation of application No. 12/116,258, filed on May 7, 2008, now Pat. No. 8,086,865.

(51) Int. Cl.
*H04L 9/12*      (2006.01)

(52) U.S. Cl.
USPC ................................ 713/181; 380/262

(58) Field of Classification Search
None
See application file for complete search history.

(56) References Cited

U.S. PATENT DOCUMENTS

| 6,173,400 B1 * | 1/2001 | Perlman et al. ................ 713/172 |
| 2004/0083368 A1 * | 4/2004 | Gehrmann .................... 713/171 |

\* cited by examiner

*Primary Examiner* — Gilberto Barron, Jr.
*Assistant Examiner* — David Le
(74) *Attorney, Agent, or Firm* — Young Basile Hanlon & MacFarlane P.C.

(57) ABSTRACT

The present invention provides for authenticating a message. A security function is performed upon the message. The message is sent to a target. The output of the security function is sent to the target. At least one publicly known constant is sent to the target. The received message is authenticated as a function of at least a shared key, the received publicly known constants, the security function, the received message, and the output of the security function. If the output of the security function received by the target is the same as the output generated as a function of at least the received message, the received publicly known constants, the security function, and the shared key, neither the message nor the constants have been altered.

20 Claims, 2 Drawing Sheets

AUTHENTICATING MESSAGES USING CRYPTOGRAPHIC ALGORITHM CONSTANTS SUPPLIED TO A STORAGE-CONSTRAINED TARGET

CROSS-REFERENCE TO RELATED APPLICATIONS

This application is a continuation of application Ser. No. 12/116,258, filed May 7, 2008, now U.S. Pat. No. 8,086,865, which is a continuation of application Ser. No. 10/733,935, filed Dec. 10, 2003, now U.S. Pat. No. 7,389,419.

TECHNICAL FIELD

The invention relates generally to security systems and, more particularly, to a security system concerning the validation of received messages.

BACKGROUND

In conventional processing systems, storage space in computer systems can be a concern. In computer systems implementing security protocols, the algorithm for security can occupy less space than the constants used to implement the security. For instance, the chain security algorithm can be implemented in less than 200 bytes, while 1024 publicly-known bytes are needed for the constants to run the chain algorithm. In the chain algorithm, the source and target systems both know and utilize the same secret key. Similarly, an algorithm such as the Secure Hash Algorithm (SHA) can be implemented in 512 bits, but needs 80 64-bit publicly known constants to make it work properly, although the source and target systems both know and utilize the same secret key in addition to the publicly known constants.

However, space constraints can create a problem with the target computer where the algorithms are to be implemented. The target computer might have memory space to store the algorithm and the secret key, but does not have all of the memory space necessary to store the publicly known constants. Increasing the size of the memory may not be a viable option, due to cost of implementation.

Therefore, there is a need for a method and a system for a target computer to process the publicly known security constants in a manner that accommodates the target computer's memory constraints.

SUMMARY OF THE INVENTION

The present invention provides for authenticating a message. A security function is performed upon the message. The message is sent to a target. The output of the security function is sent to the target. At least one publicly known constant is sent to the target. The received message is authenticated as a function of at least a shared key, the received publicly known constants, the security function, the received message, and the output of the security function.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
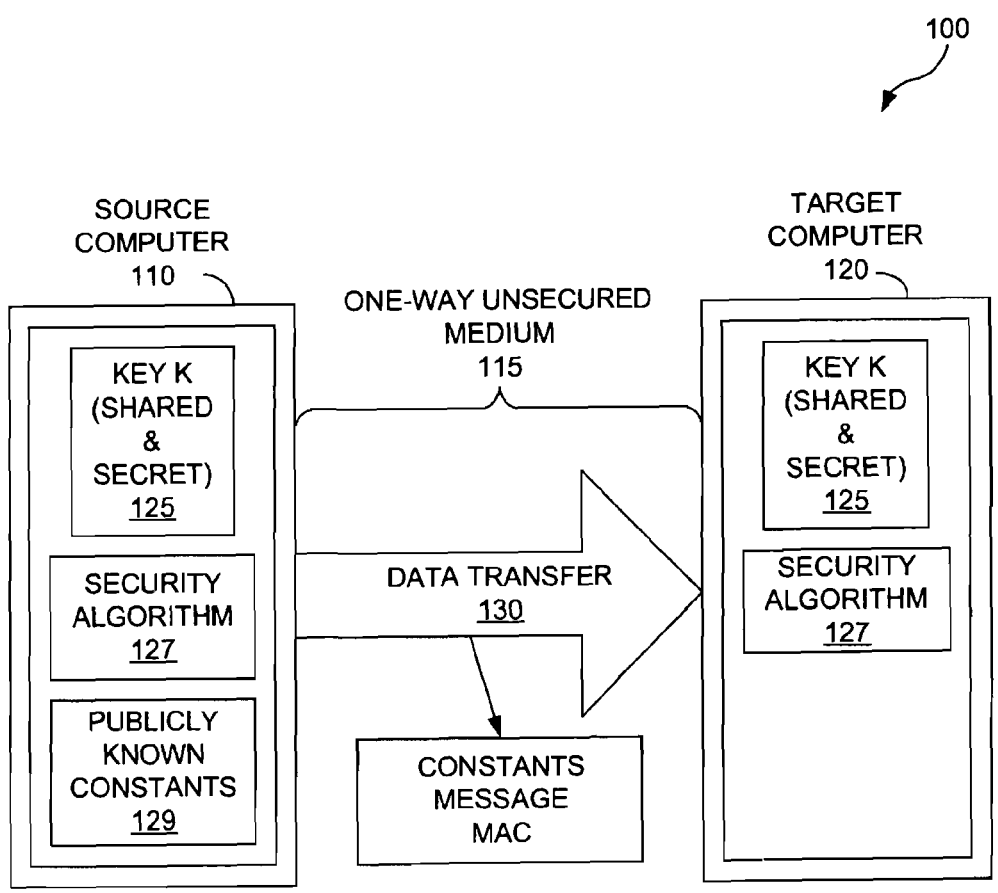
FIG. 1 schematically depicts a system for transferring a message, publicly known constants, and a message authentication code (MAC)

Turning now to FIG. 1, disclosed is a computer security system 100. In FIG. 1, illustrated is a source computer 110 and a target computer 120 communicating across an unsecured medium 115. The source computer 110 and the target computer 120 share the same secret key 125. Generally, the system 100 sends publicly known constants for a security algorithm from the source computer 110 to the target computer 120, thereby allowing for the target computer 120 not to have these constants stored within the target computer while still allowing the target computer 120 to validate received messages. For example, SHA-512 has eighty 64-bit publicly known constants which are the first 64 bits of the fractional parts of the cube roots of the first eighty prime numbers. In the system 100, the shared key 125, the security algorithm 127, the messages and the publicly known constants 129 are stored in memory of the source computer 110, or are otherwise generated in a processor of the source computer 110. The shared key 125, the security algorithm 127 are stored in memory of the source computer 110, or are otherwise generated in a processor of the target computer 120.

In FIG. 1, source computer 110 has a message it selects to send to target computer 120 over the insecure medium 115 in a data transfer 130. The target computer 120 has the security algorithm 127 and the secret key 125, but not the publicly known constants 129 necessary for proper use of the security algorithm. Therefore, the source 110 also sends the publicly known security constants 129. This occurs as follows, and is done in associated with sending security-type information concerning the message itself to the target computer 120 over the one-way unsecured medium 115 in the data transfer 115.

In one embodiment of the use of the security algorithm 127 in the system 100, the message from the source is hashed, a form of the security algorithm 127, using the secret key 125 and the publicly known constants 129. The hashing creates a message authentication code (MAC) from the message, the secret key 125, and the publicly known constants 129. In other words, MAC is equal to a Hash function of the secret key 125, public constants 127, and the message to be hashed. The hash algorithm can be a cryptographically secure one-way hash function, such as the SHA, for the Secure Hash Algorithm (SHA).

After performing the security function, the source computer 110 then sends the Message (perhaps encrypted), the MAC value, or some other security value and the publicly known constants 129 used in the hash to the target computer 120 over the unsecured medium 115 in the data transfer 130. The target computer 120 receives the computed MAC or other security code, the message and the publicly known constants 129.

The target computer 120 then recomputes its own MAC value, using its secret key 125, the received publicly-known constants 129 from the source computer 110, the received message, the shared key 125, and the hash function or other security algorithm 127. If the MAC the target computer 120 calculates for the received message using the received publicly known constants 129 and the security algorithm 127 and the secret key 125 equals the MAC the target computer 120 received from the source 110, then the message and the constants are authentic.

If the MAC calculated by the target computer 120 and the MAC received by the source computer 110 do not equal, either the message or the publicly known constants 129 have been changed, and therefore the Message is not validated as authentic.

Note that an unauthorized person could read or modify the Message, the MAC or the hash constants when these values are conveyed over the one-way unsecured medium 115 and try to "fool" the target computer 120 as to the authenticity of the communication. However, the MAC is a function of the message, the publicly known constants 129 constants, and the secret key 125, and the security algorithm 127. As the unauthorized will not know what the secret key 127 is, it is highly unlikely that an adversary would be able to properly change the message and the publicly known constants 129 and the message to pass authentication by the target computer 120.

Figure 2:
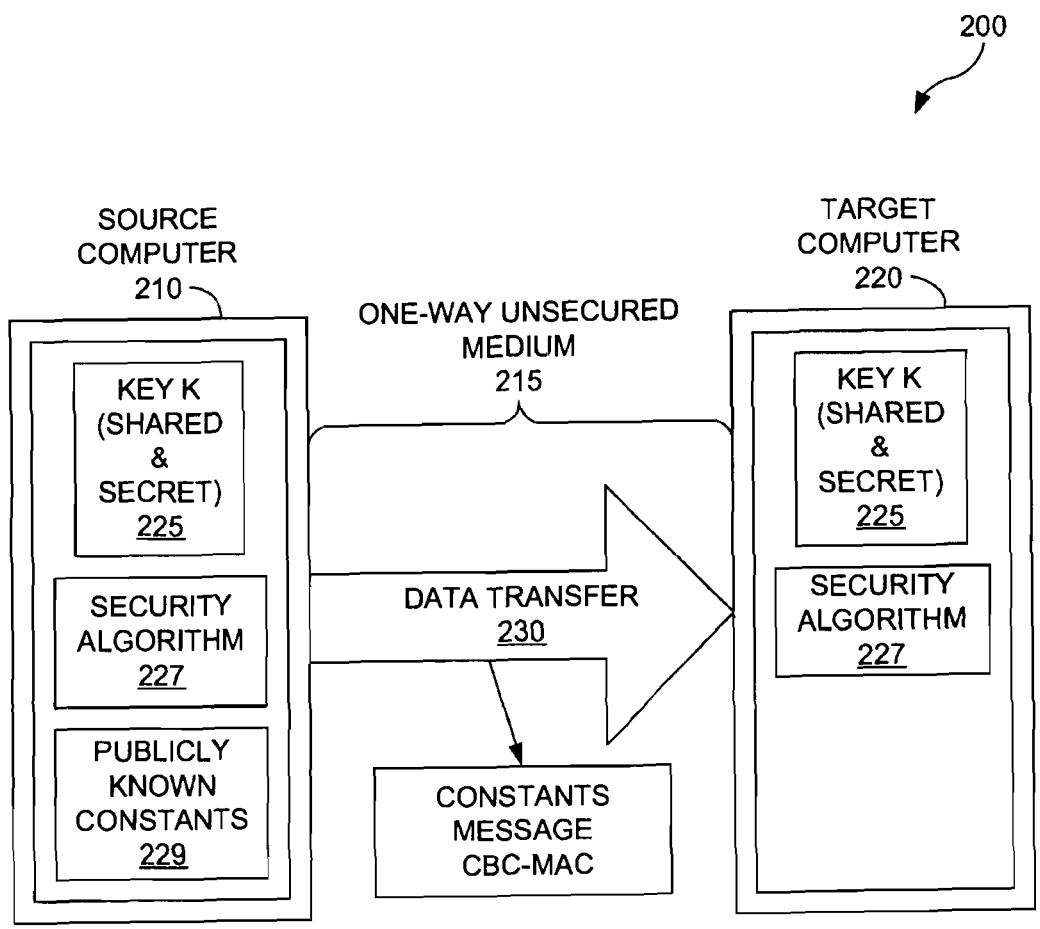
FIG. 2 schematically depicts a system for transferring a message, publicly known constants, and a CBC-MAC value.

Turning now to FIG. 2, disclosed is a computer security system 200 that employs encryption for the sent message for added security for the message. In FIG. 2, a source computer 210 and a target computer 220 communicating across an unsecured medium 215. The source computer 210 and the target computer 220 share the same secret key 225. Generally, the system 200 sends publicly known constants for a security algorithm from the source computer 210 to the target computer 220, thereby allowing for the target computer 220 not to have these constants stored within the target computer while still allowing the target computer 220 to validate received messages.

In the system 200, the shared key 225, the security algorithm 227, the messages and the publicly known constants 129 are stored in memory of the source computer 210, or are otherwise generated in a processor of the source computer 210. The shared key 225, and the security algorithm 227 are stored in memory of the target computer 210, or are otherwise generated in a processor of the target computer 220.

The target computer 220 performs an optional decryption upon the message from the source computer 110, as well as a validation of the received message. In one embodiment, the source computer 210 uses CBM-MAC (cipher block chaining message authentication code) as its security algorithm 227 on the message before sending the encrypted message and the publicly known constants 229 to the target computer 220.

When performing the encryption, the source computer 220 can perform the encryption substantially as follows, although those of ordinary skill in the art, other encryption algorithms are within the scope of the present Application.

First, the message to be sent is broken down into a series of blocks $M=M_1, M_2 \ldots M_n$. Then, values useful for running the security algorithm 127 are generated. First, $Y_1=Enc(M_1)$ In other words, the value $Y_1$ is created from the encryption of $M_1$, using the secret key value 225, the security algorithm 227 and the publicly known constants 229.

Furthermore, there are other Y values created, $Y_2$, $Y_3$, $Y_4 \ldots Y_n$. These other values are created as follows. $Y_i=Enc(M_i \text{ XOR } Y_{i-1})$. In other words, the $Y_i$ value is the encryption of the Mi value "Exclusive-Or"ed with the $Y_{i-1}$ value. The $Y_i$ value is then used when determining the $Y_{i+1}$ value, and so on, until the last Mi value is encrypted in $Y_n$. Yn is then the CBC-MAC value.

The source computer 210 then sends the message, the CBC-MAC value and the publicly known constants 229 to the target computer 220. The target computer then performs its own CBC-MAC check using the received publicly known constants 229, the secret key 225, and the received message. The message can be encrypted or unencrypted. Both options are allowed. If the computed CBC-MAC is the same as the received CBC-MAC, then the target 220 determines that the message and publicly known constants 220 are authentic, in other words, not modified. The target 220 uses the shared key 220, the security algorithm 227, and the received message, publicly known constants 229 and the CBC-MAC value for computing its own CBC-MAC.

Although the CBC-MAC, the message itself, and/or the constants could be altered during transmission over the insecure media, it is highly unlikely that an adversary would be able to successfully make the correct changes to the CBC-MAC, the constants and/or the message, because the adversary would not know the secret key to do this properly. Note that while the message itself can be read in the unsecured environment, it could not be altered. For some kinds of security applications, this is sufficient.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for authenticating a message, comprising:
performing a security function upon the message;
sending, by a source computing device, the message to a receiver computing device;
sending, by the source computing device, the output of the security function to the receiver computing device;
sending, by the source computing device, at least one publicly known constant to the receiver computing device; and
authenticating, by the receiver computing device, the received message as a function of at least a shared key, the received publicly known constants, the security function, the received message, and the output of the security function, wherein the receiver computing device does not store the at least one publicly known constant prior to receiving the at least one publicly known constant from the source computing device, and wherein the at least one publicly known constant comprises at least a portion of a plurality of publicly known constants used by the security function performed upon the message.

2. The method of claim 1, wherein the security function comprises a hash function.

3. The method of claim 1, wherein the authenticating comprises a determination that the message is authentic.

4. The method of claim 1, wherein the authenticating comprises a determination that the message is not authentic.

5. The method of claim 1, wherein the security function further comprises an encryption function.

6. The method of claim 1, wherein the security function further comprises a decryption function.

7. A system for authenticating messages, comprising:
a source node having a shared key, security logic and a set of publicly known constants required to implement the security logic on messages transmitted by the source node; and
a target node also having the shared key and the security logic, the target node further configured to receive at least one publicly known constant from the source node, but not storing the set of publicly known constants prior to receiving the at least one publicly known constant from the source node, wherein the source node transmits a message, a message authentication code, and the at least one publicly known constant selected from the set of publicly known constants to the target node and the target node authenticates the transmitted message based on the message authentication code and the at least one publicly known constant, and wherein the at least one publicly known constant comprises at least a portion of the set of publicly known constants used by the security logic to perform a security function on the message.

8. The system of claim 7, wherein the source node comprises a computer.

9. The system of claim 7, wherein the security logic is configured to implement a hashing function.

10. The system of claim 7, further comprising an unsecured medium coupled between an output of the source node and an input of the target node.

11. The system of claim 7, wherein the source node is further configured to generate a message authentication code (MAC) as a hash of at least the message, the at least one publicly known constant, and a secret key.

12. The system of claim 7, wherein the target node is further configured to receive a message authentication code (MAC).

13. The system of claim 12, wherein the target node is further configured to employ the MAC to authenticate a received message from the source node.

14. A computer program product for authenticating a message, the computer program product being a non-transitory medium with a computer program embodied thereon, the computer program comprising:
computer code for performing a security function upon the message to generate a message authentication code, wherein the security function utilizes at least one publicly known constant to perform the security function upon the message, and wherein the at least one publicly known constant is selected from a set of publicly known constants used to implement the security function;
computer code for sending the message to a target computing device;
computer code for sending the message authentication code to the target computing device; and
computer code for sending the at least one publicly known constant, used by the security function to perform the security function upon the message, to the target computing device, wherein the target computing device authenticates the message based on the message authentication code and the at least one publicly known constant, wherein the target computing device does not store the at least one publicly known constant prior to receiving the at least one publicly known constant from the source computing device.

15. An apparatus for authenticating a message, comprising:
a computer including a computer program, the computer program comprising:
computer code for performing a security function upon the message to generate a message authentication code, wherein the security function utilizes at least one publicly known constant to perform the security function upon the message, and wherein the at least one publicly known constant is selected from a set of publicly known constants used to implement the security function;
computer code for sending the message to a target computing device;
computer code for sending the message authentication code to the target computing device; and
computer code for sending the at least one publicly known constant, used by the security function to perform the security function upon the message, to the target computing device, wherein the target computing device authenticates the message based on the message authentication code and the at least one publicly known constant, wherein the target computing device does not store the at least one publicly known constant prior to receiving the at least one publicly known constant from the source computing device.

16. The system of claim 7, wherein the security function is a Secure Hash Algorithm (SHA), and wherein the set of publicly known constants comprises the first 64 bits of the fractional parts of the cube roots of the first eighty prime numbers.

17. The system of claim 7, wherein the target node authenticates the message as a function of at least the shared key, the at least one publicly known constant, the security function, the message, and a message authentication code.

18. The system of claim 12, wherein the target node:
computes a second MAC based on the received at least one publicly known constant, the received message, and a secret key stored by the target node;
compares the second MAC to the received MAC; and determines that the received message is authentic in response to the second MAC matching the received MAC.

19. The system of claim 9, wherein the hashing function is applied to a secret key, the at least one publicly known constant, and the message such that the resulting message authentication code is equal to a hash of the combination of the secret key, the at least one publicly known constant, and the message.

20. The system of claim 7-12, wherein the MAC is a function of at least a message, a secret key, the secret function and the set of publicly known constants.

* * * * *